United States Patent Office 2,870,167
Patented Jan. 20, 1959

2,870,167
PREPARATION OF α-CHLOROGLUTARIC ANHYDRIDE

Arthur Francis Kirby, Woodbury, N. J., assignor to E. I. du Pont de Nemours and Company, Wilmington, Del., a corporation of Delaware No Drawing. Application December 28, 1956
Serial No. 631,034

3 Claims. (Cl. 260—345.9)

The present invention relates to the production of useful chloro compounds and, more particularly, to the production of novel α-chloroglutaric acid derivatives.

DL-glutamic acid, a precursor for the monosodium salt of L-glutamic acid now in wide use as a flavor-enhancing agent in foods, can be prepared readily from α-chloroglutaric acid and certain of its derivatives. This preparation of DL-glutamic acid, which is described in assignee's copending application Serial No. 631,037, filed December 28, 1956, involves treatment of the α-chloro acid or one of its derivatives with aqueous ammonia at a temperature between 150 and 275° C. under autogenous pressure. Hence, the need exists for an economical method of producing α-chloroglutaric acid and derivatives.

Accordingly, an object of the present invention is to provide a process for the preparation of an α-chloroglutaric acid derivative. A further object of the present invention is to provide a process for the preparation of α-chloroglutaric anhydride. Other objects will become apparent as the invention is further described.

I have found that the foregoing objects are achieved when I cause chlorine to react with glutaric anhydride.

In accordance with the process of the invention, chlorine is caused to react with glutaric anhydride at a temperature between about 75 and about 160° C.

The following examples illustrate specific embodiments of the method of carrying out the process of the invention. However, they are not to be considered as limiting the invention in any way. The parts in examples are parts by weight, and the conversions reported are based on the weight of glutaric anhydride charged.

Example 1

Chlorine gas was bubbled at a rate of approximately 0.3 part per minute into 45.6 parts of mechanically stirred molten glutaric anhydride maintained at a temperature of 105 to 115° C. until the index of refraction, at 25° C., of the product was about 1.4950. The chlorine feed then was stopped, and the residual portion of the hydrogen chloride was flushed from the reactor with dry nitrogen. The conversion of glutaric anhydride to α-chloroglutaric anhydride was 51%. Similar conversions to α-chloroglutaric anhydride were obtained when the procedure of the foregoing run was repeated, with the exception that temperatures between about 110 and about 160° C. were used.

Confirmatory evidence for the structure of the α-chloroglutaric anhydride was obtained when the anhydride was treated for 9 hours with aqueous ammonia at 250° C. by the method described in assignee's copending application mentioned in the foregoing and DL-glutamic (DL-α-aminoglutaric) acid thereby was obtained.

Example 2

The procedure of Example 1 was followed, except that the reaction was effected in the presence of 3.2 parts of phosphorus trichloride as catalyst and the reaction temperature was maintained between about 80 and about 95° C. The chlorine feed was stopped when the index of refraction (at 25° C.) of the product was 1.4885. The conversion of glutaric anhydride to α-chloroglutaric anhydride was 61%.

As the foregoing examples illustrate, chlorination of glutaric anhydride by the present process gives good yields of α-chloroglutaric anhydride, a previously unknown compound very readily convertible to the useful DL-glutamic acid.

Comparison of Examples 1 and 2 shows that the present process may be effected either with or without a catalyst; a catalyst is especially useful when lower temperatures are used. While I have illustrated the use of phosphorus trichloride, other phosphorus-containing catalysts such as elemental phosphorus, other phosphorus halides, or phosphorus oxyhalides, oxygen acids, or oxides would be equally suitable.

The present process can be effected at temperatures between about 75 and about 160° C. Below about 75° C., the reaction is too slow to be technically attractive and, above 160° C., undesirable side reactions occur.

Preferably, the reaction is allowed to proceed for such time as required for a stoichiometric amount of chlorine to react with the glutaric anhydride. Hence, the reaction time is not limited to any specific period but, rather, is governed generally by the rate of feed of chlorine, the temperature range employed, and the like. Although the use of stoichiometric quantities of the reactants is preferred, the presence of a slight excess of the glutaric anhydride is not deleterious to the process of the present invention, and the unreacted anhydride can be recovered by conventional means.

The reaction may be represented by the following equation:

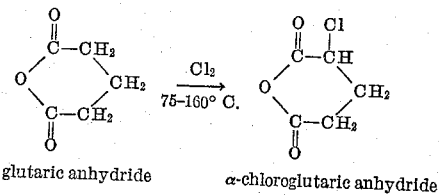

glutaric anhydride       α-chloroglutaric anhydride

The present process has been described in detail in the foregoing, but it will be apparent that many modifications may be introduced without departure from the scope of the invention. I intend, therefore, to be limited only by the following claims.

I claim:

1. A process for the production of α-chloroglutaric anhydride which comprises reacting chlorine and glutaric anhydride at a temperature between about 75 and about 160° C.

2. The process as claimed in claim 2, wherein the chlorine and the glutaric anhydride are present in substantially stoichiometric quantities.

3. A process for the production of α-chloroglutaric anhydride which comprises reacting chlorine and glutaric anhydride at a temperature between about 75 and about 160° C. and in the presence of a catalyst selected from the group consisting of phosphorus, phosphorus halides, phosphorus oxyhalides, phosphorus oxygen acids, and phosphorus oxides.

References Cited in the file of this patent
UNITED STATES PATENTS 2,820,821   Guest _____ Jan. 21, 1958

UNITED STATES PATENT OFFICE
CERTIFICATE OF CORRECTION

Patent No. 2,870,167                                January 20, 1959

Arthur Francis Kirby

It is hereby certified that error appears in the printed specification of the above numbered patent requiring correction and that the said Letters Patent should read as corrected below.

Column 1, line 23, for "copenling" read -- copending --; column 2, line 56, for the claim reference numeral "2" read -- 1 --; throughout the printed patent for "DL", each occurrence, read -- DL --.

Signed and sealed this 5th day of May 1959.

(SEAL)

Attest:
KARL H. AXLINE                                             ROBERT C. WATSON Attesting Officer                                        Commissioner of Patents